(12) United States Patent
Ahmed et al.

(10) Patent No.: US 10,464,609 B2
(45) Date of Patent: Nov. 5, 2019

(54) SMALL OVERLAP IMPACT COUNTERMEASURE FOR VEHICLE

(71) Applicants: Sayeed S Ahmed, Rochester Hills, MI (US); Derek Chance, Sterling Heights, MI (US); Sreenivas Vedula, Farmington Hills, MI (US); Pradeep Salla, Rochester Hills, MI (US); Rajkumar Rajagopalan, Troy, MI (US)

(72) Inventors: Sayeed S Ahmed, Rochester Hills, MI (US); Derek Chance, Sterling Heights, MI (US); Sreenivas Vedula, Farmington Hills, MI (US); Pradeep Salla, Rochester Hills, MI (US); Rajkumar Rajagopalan, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 3 days.

(21) Appl. No.: 15/812,523

(22) Filed: Nov. 14, 2017

(65) Prior Publication Data
US 2019/0144039 A1 May 16, 2019

(51) Int. Cl.
*B62D 21/15* (2006.01)
*B60K 17/00* (2006.01)
*B60R 19/34* (2006.01)
*B60R 19/52* (2006.01)

(52) U.S. Cl.
CPC ............ *B62D 21/152* (2013.01); *B60K 17/00* (2013.01); *B60R 19/34* (2013.01); *B60R 19/52* (2013.01)

(58) Field of Classification Search
CPC .. B62D 21/152; B62D 25/082; B62D 21/155; B62D 25/08; B62D 25/04; B62D 25/025
USPC .................. 296/187.1, 192, 203.01, 29, 209; 293/133, 132, 155, 102, 149, 153, 154
See application file for complete search history.

(56) References Cited

U.S. PATENT DOCUMENTS

| | | |
|---|---|---|
| 8,596,711 B2 * | 12/2013 | Yasui ...................... B60R 19/34 296/187.09 |
| 8,608,231 B1 | 12/2013 | Mendivil et al. |
| 8,991,544 B1 | 3/2015 | Stratten et al. |
| 9,156,418 B2 | 10/2015 | Ramoutar et al. |
| 9,180,828 B2 | 11/2015 | Sakakibara et al. |
| 9,233,715 B1 | 1/2016 | Ramoutar et al. |
| 9,242,673 B2 | 1/2016 | Okamoto |
| 9,481,395 B2 | 11/2016 | Baccouche et al. |
| 9,550,462 B2 | 1/2017 | Ramoutar et al. |

(Continued)

*Primary Examiner* — D Glenn Dayoan
*Assistant Examiner* — Sunsurraye Westbrook
(74) *Attorney, Agent, or Firm* — Ralph E Smith

(57) ABSTRACT

A structural support system, for a vehicle having a central axis extending from a front of the vehicle to a rear of the vehicle, includes a radiator cross member, a lower load beam having a rearward end coupled to a frame of the vehicle, and a forward end coupled to the radiator cross member, the lower load beam oriented at an angle relative to the central axis and extending outwardly as the lower load beam extends toward the front of the vehicle, a front end module (FEM) coupled to the radiator cross member, and an impact block coupled to a transmission of the vehicle. During an impact event where an object impacts the FEM, the FEM and the radiator cross member are configured to absorb an impact load resulting from the impact event and bend rearward and inboard toward the transmission.

17 Claims, 6 Drawing Sheets

(56) References Cited

U.S. PATENT DOCUMENTS

| | | | |
|---|---|---|---|
| 2012/0007373 A1* | 1/2012 | Boettcher | B60R 19/24 |
| | | | 293/132 |
| 2012/0248820 A1 | 10/2012 | Yasui et al. | |
| 2012/0313398 A1* | 12/2012 | Shin | B62D 21/152 |
| | | | 296/187.1 |
| 2013/0320709 A1* | 12/2013 | Kuwabara | B62D 21/152 |
| | | | 296/187.09 |
| 2014/0091585 A1 | 4/2014 | Ramoutar et al. | |
| 2014/0091598 A1* | 4/2014 | Park | B62D 25/08 |
| | | | 296/203.02 |
| 2014/0361559 A1 | 12/2014 | Sakakibara et al. | |
| 2014/0361560 A1 | 12/2014 | Sakakibara et al. | |
| 2015/0035316 A1 | 2/2015 | Kuriyama et al. | |
| 2015/0097394 A1 | 4/2015 | Alavandi et al. | |
| 2016/0152201 A1 | 6/2016 | Ramoutar et al. | |

\* cited by examiner

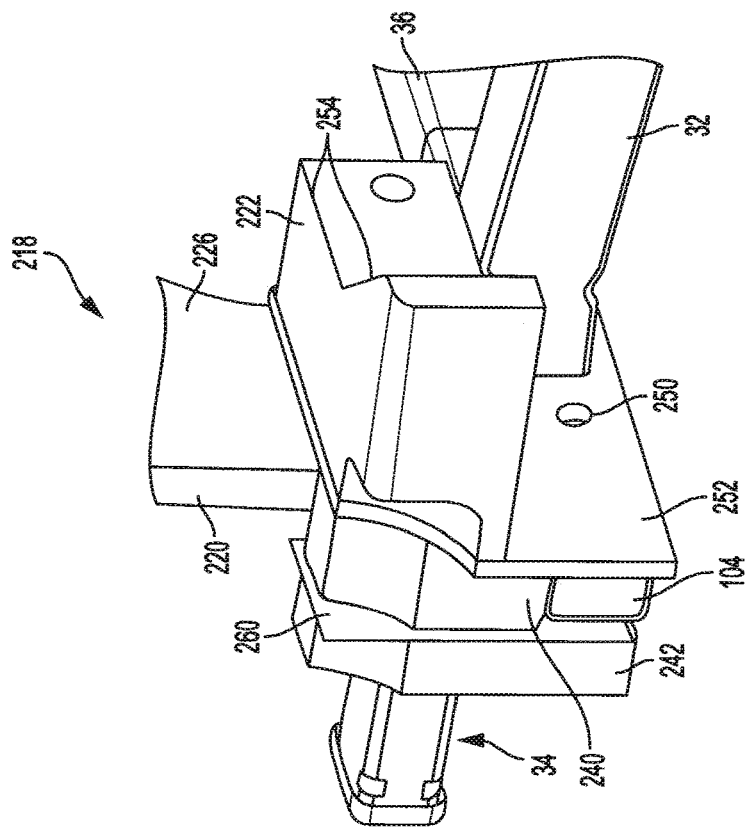
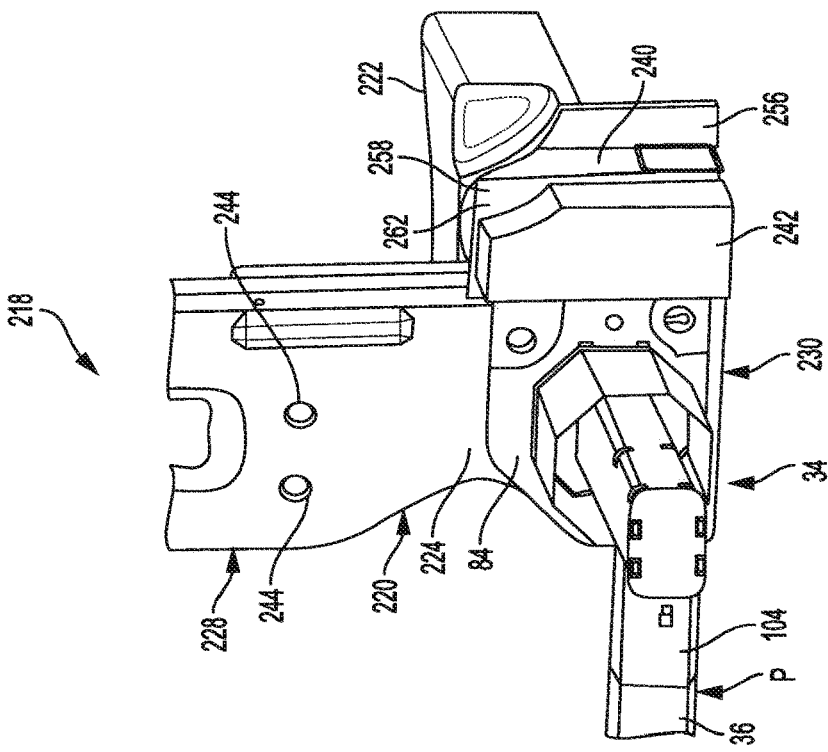

_US 10,464,609 B2_

SMALL OVERLAP IMPACT COUNTERMEASURE FOR VEHICLE

FIELD

The present application relates generally to vehicle structural systems and, more particularly, to a vehicle structural system to reduce potential occupant compartment intrusion in small overlap frontal impacts.

BACKGROUND

Some vehicles include impact protection structures to absorb energy from an impact event to protect vehicle passengers. In a small overlap impact event, a large amount of the impact is directed outboard of the main energy absorbing structures, and front portions of the vehicle may deform. Such an impact can prevent engagement of the primary load carrying and energy absorbing members, which can potentially result in different energy absorption. Accordingly, while such impact protection structures work well for their intended purpose, it is desirable to provide continuous improvement in the relevant art.

SUMMARY

According to one example aspect of the invention, a structural support system for a vehicle having a central axis extending from a front of the vehicle to a rear of the vehicle is provided. The system includes a radiator cross member, a lower load beam having a rearward end coupled to a frame of the vehicle, and a forward end coupled to the radiator cross member, the lower load beam oriented at an angle relative to the central axis and extending outwardly as the lower load beam extends toward the front of the vehicle, a front end module (FEM) coupled to the radiator cross member, and an impact block coupled to a transmission of the vehicle. During an impact event where an object impacts the FEM, the FEM and the radiator cross member are configured to absorb an impact load resulting from the impact event and bend rearward and inboard toward the transmission such that the impact block diverts the impact load laterally to the transmission to move the vehicle in a substantially lateral cross-car direction away from the object.

In addition to the foregoing, the described system may include one or more of the following features: a lower crush can coupled to a forward surface of the FEM; wherein the lower crush can is disposed along an offset axis of the vehicle defining an outer quarter of a total width of the vehicle; wherein the lower crush can laterally overlaps the lower load beam a predetermined distance; wherein the predetermined distance is between approximately 30 mm and approximately 50 mm; and an insert member disposed within a portion of the radiator cross member.

In addition to the foregoing, the described system may include one or more of the following features: wherein the portion of the radiator cross member having the insert member is a reinforced section and the portion of the radiator cross member without the insert member is an unreinforced section, wherein a bending point is defined between the reinforced section and the unreinforced section such that during the impact event, the radiator cross member bends proximate the bending point; wherein the lower crush can includes an outer portion and an inner portion; and wherein the outer portion has an octagonal cross-section and the inner portion has a rectangular cross-section.

In addition to the foregoing, the described system may include one or more of the following features: wherein the FEM includes a module main body having an upper portion and a lower portion; wherein the lower crush can is coupled to the lower portion; an upper crush can coupled to the upper portion; wherein the upper crush can is coupled to a bumper of the vehicle; a main load rail having one end coupled to the FEM behind the upper crush can to absorb an impact load therefrom; an intermediate impact block coupled rearward of a front impact block; a front spacer plate disposed between the front impact block and the radiator cross member; and a laterally extending plate member disposed rearward of the intermediate impact block.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 5 is a front perspective view of an alternative small overlap impact absorbing FEM in accordance with the principles of the present invention;

FIG. 6 is a rear perspective view of the FEM shown in FIG. 5, in accordance with the principles of the present disclosure;

DETAILED DESCRIPTION

The present application is directed to a vehicle structural system configured to absorb impact loads during a small overlap impact event. The system includes a small overlap impact absorbing front end module configured to rotate rearward and inboard during the impact event to transfer impact loads laterally to the vehicle transmission, thereby rotating the vehicle away from the collision object and facilitating reducing intrusion into the vehicle passenger compartment.

Figure 4:
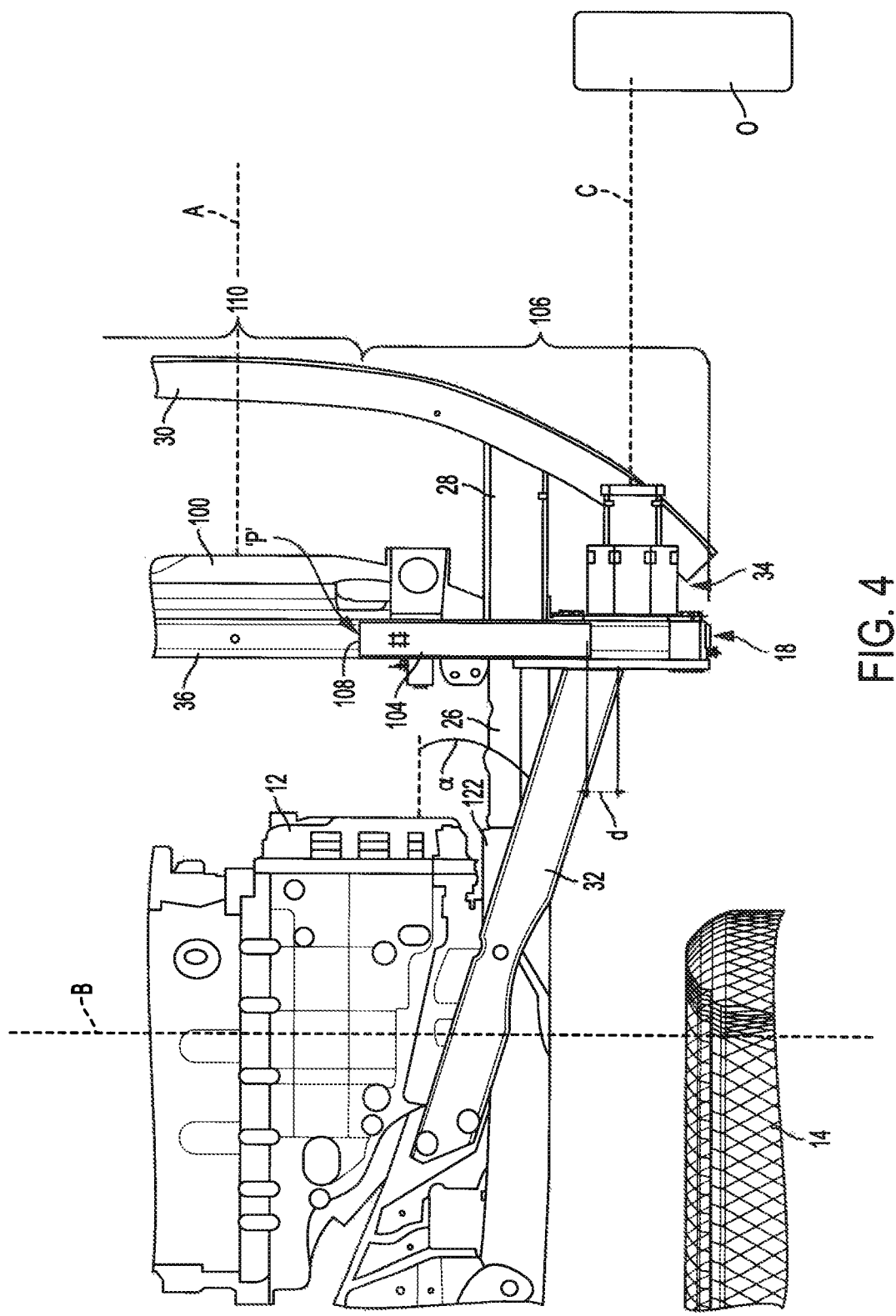
FIG. 4 is a bottom view of the system shown in FIG. 1, in accordance with the principles of the present disclosure.

With initial reference to FIGS. 1-4, an example vehicle is illustrated and generally identified at reference numeral 10. The vehicle generally includes a transmission 12, wheels 14, a structural support assembly or system 16, and a small overlap impact absorbing front end module (FEM) 18. A front end 20 of the vehicle 10 is illustrated and the vehicle 10 generally extends fore-aft along a central axis 'A' between the front 20 and rear (now shown) of the vehicle. An axis 'B' extends cross-car and is orthogonal to central axis 'A'. As shown in FIG. 4, a barrier or object 'O' is positioned in accordance with the IIHS small overlap test to impact the vehicle 10 in a 25% vehicle width barrier overlap situation.

A front left portion 22 of the vehicle structural support system 16 is illustrated in FIGS. 1-4. While only the front left portion 22 of the vehicle structural support system 16 is illustrated, the front right portion (not shown) is constructed in a similar (e.g., mirrored) manner. In the example implementation, the front left portion 22 of the vehicle structural support system 16 generally includes a cradle 24, an upper load path beam or main load rail 26, an upper crush can 28, a bumper 30, a lower load beam 32, a lower crush can 34, a radiator cross-member 36, and the impact absorbing FEM 18.

The cradle 24 is a forward portion of the chassis or frame and is configured to support the vehicle engine (not shown) and transmission 12. Moreover, the cradle 24 is a structural member configured to transmit loads from the front 20 to the rear portions of the chassis.

The main load rail 26 extends parallel to or substantially parallel to central axis 'A' and generally includes a forward end 40 and an opposite rearward end 42. The forward end 40 is disposed toward the vehicle front 20, and the rearward end 42 is disposed toward the vehicle rear and coupled to a dash panel (not shown). In the example embodiment, the main load rail 26 includes an inner shell 44 and an outer shell 46 coupled together to form a generally tubular beam. A plate member 48 is coupled (e.g., welded) to the forward end 40 of the main load rail 26 and includes one or more aperture 50 (FIG. 2) to receive a fastener (not shown).

The shape of the main load rail 26 is configured to facilitate a degree of controlled axial deformation under predetermined loads such as, for example, full frontal impacts. Accordingly, the load beam 26 includes vertically extending indentations 52 to facilitate collapsing of the main load rail 26. In the illustrated example, main load rail 26 includes three indentations 52 formed in the outboard side (outer shell 46) and two indentations 52 formed in the inboard side (inner shell 44) (see FIG. 2).

In the example embodiment, the upper crush can 28 has a generally rectangular cross-section and includes a forward end 54 and a rearward end 56. The forward end 54 is disposed behind the bumper 30, and the rearward end 56 is coupled to a plate member 58 having one or more apertures 60 (FIG. 1) configured to align with the one or more aperture 50 to receive a fastener. In other examples, the forward end 54 is coupled to the bumper 30. The upper crush can 28 has a shape that facilitates controlled collapsing or crushing under particular loads along the direction of the central axis 'A'. Moreover, in the example embodiment, upper crush can 28 includes one or more notches 62 formed in the corners of the upper crush can 28 to facilitate collapsing.

The bumper 30 is a generally tubular body extending laterally across the front 20 of the vehicle 10. As illustrated in FIG. 4, the ends 64 (only one shown) of the bumper 30 are curved or angled toward a rear of the vehicle. In one example, the bumper 30 is coupled to the forward end 54 of the crush can 28.

In the example embodiment, the lower load beam 32 is generally tubular and includes a rearward end 70 and an opposite forward end 72. The lower load beam 32 extends laterally at an angle 'a' relative to the central axis 'A' and is flared out or extends outwardly as it extends from a rearward end 70 to an opposite forward end 72 (see FIG. 4). The rearward end 70 is coupled to the cradle 24, and the forward end 72 is coupled to a mounting plate 74 having a plurality of apertures 68 (FIG. 2) to receive fasteners (not shown). In this way, mounting plate 74 is coupled to the FEM 18 and/or radiator cross-member 36 to couple the lower load beam 32 thereto.

The shape of the lower load beam 32 is configured to facilitate a degree of controlled axial deformation under predetermined loads such as, for example, the small overlap frontal impact. Accordingly, the lower load beam 32 includes both vertically extending indentations 76 and laterally extending indentations 78 to facilitate collapsing of the lower load beam 32. In the illustrated example, the lower load beam 32 includes two laterally extending indentations 78 located proximate the forward end 72 and two vertically extending indentations 76 located approximately at the midway point of the lower load beam 32. Moreover, one of the vertically extending indentations 76 is formed on the inboard side of beam 32 and is smaller (e.g., width) than the vertically extending indentation 76 formed on the outboard side of the beam 32 (see FIG. 4).

In the example embodiment, the lower crush can 34 generally includes an outer portion 80, an inner portion 82, and a mounting plate 84. As shown in FIG. 4, the lower crush can 34 is located on an offset axis 'C' that, in the example embodiment, is offset from the central axis 'A' by 25% or approximately 25% of the total lateral width of the vehicle 10. However, the lower crush can 34 may be located in any desired location to facilitate absorbing an impact load.

The outer portion 80 is a generally hollow tubular member. As illustrated, outer portion 80 has a generally octagonal cross-section, however, it will be appreciated that outer portion 80 can have any suitable shape that enables lower crush can 34 to function as described herein. Outer portion 80 includes a forward edge 86 and a rearward edge 88 that is coupled to the mounting plate 84. In one example, shown in FIG. 4, the outer portion 80 laterally overlaps the lower load beam 32 a predetermined distance 'd'. In one example, distance 'd' is between approximately 30 mm and approximately 50 mm, or between 30 mm and 50 mm.

The inner portion 82 includes a generally rectangular cross-section having a forward end 90 and a rearward end (not shown). The forward end 90 is free, and the rearward end is coupled to the mounting plate 84, which includes one or more apertures 94 (FIG. 1) for receiving a fastener to couple lower crush can 34 to the FEM 18. The shape of the lower crush can 34 has a shape that facilitates controlled collapsing or crushing under particular loads along (e.g., parallel to) the direction of central axis 'A'. Moreover, in the example embodiment, the outer portion 80 includes one or more notches 96 formed in the corners of the outer portion 80 to facilitate collapsing, and the inner portion 82 similarly includes one or more notches 98 formed in the corners of the inner portion 82 to facilitate collapsing.

The radiator cross member 36 is a generally tubular body extending laterally across the front 20 of the vehicle 10 parallel to or generally parallel to cross-car axis 'B'. The radiator cross member 36 is configured to couple to the chassis or cradle 24 and support a vehicle radiator 100 (FIG. 4). As shown in FIG. 4, radiator cross member 36 has a generally square or rectangular cross-section and defines open ends 102 (only one shown) at either end thereof. In the example implementation, each open end 102 is configured to receive a reinforcement or insert member 104 having a smaller, similarly shaped cross-section. When inserted, the insert member 104 extends only a portion of the length of radiator cross-member 36 and defines a higher strength reinforced section 106 of the radiator cross-member 36. An end 108 of the insert member 104 terminates at a point 'P', which defines the beginning of an unreinforced section 110 on the radiator cross-member 36.

Accordingly, point defines a location where the radiator cross-member 36 transitions between the reinforced section 106 and the unreinforced section 110. As such, when the lower crush can 34 and/or the FEM 18 is impacted during an impact event, the radiator cross member 36 will tend to buckle or bend at that point where the member 36 begins to have a relatively lower strength. Such bending enables the FEM 18 to bend inward and rearward to transfer at least a portion of the impact load to the vehicle transmission 12 (or other powertrain components), as described herein in more detail.

Figure 1:
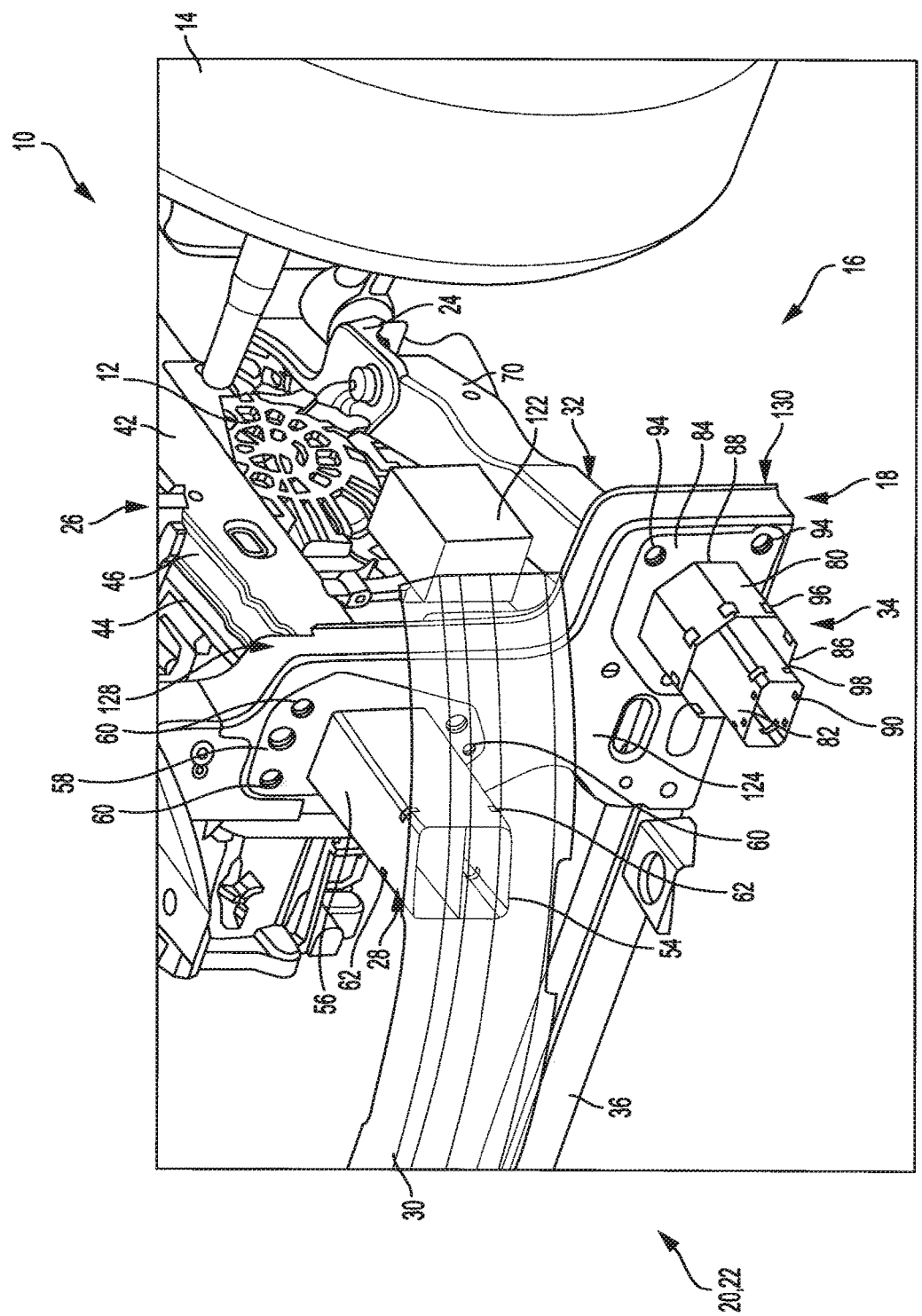
FIG. 1 is a front left perspective view of a vehicle having a structural system with a small overlap impact absorbing front end module (FEM) in accordance with the principles of the present disclosure.
Figure 2:
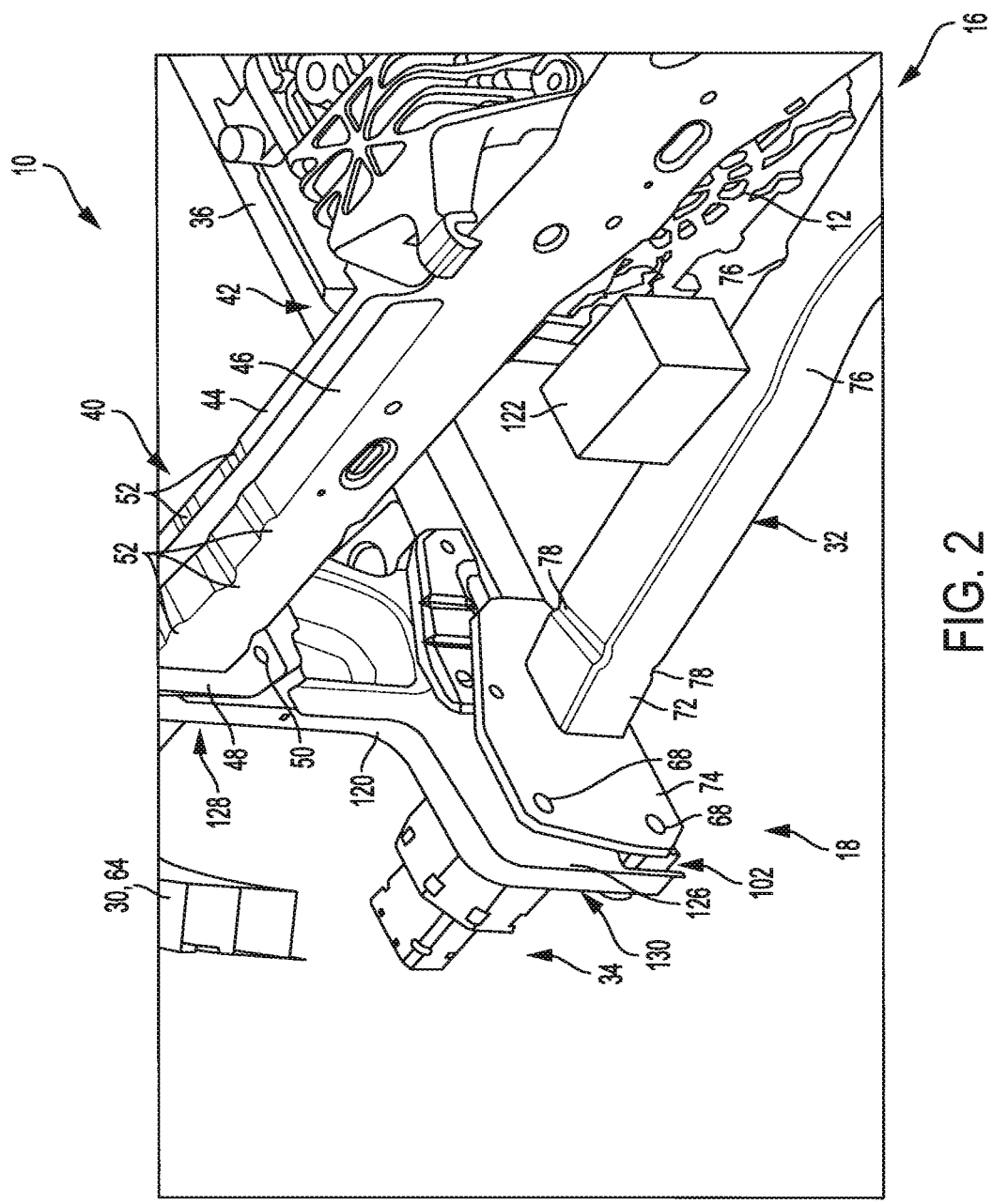
FIG. 2 is a rear perspective view of the system shown in FIG. 1, in accordance with the principles of the present disclosure.
Figure 3:
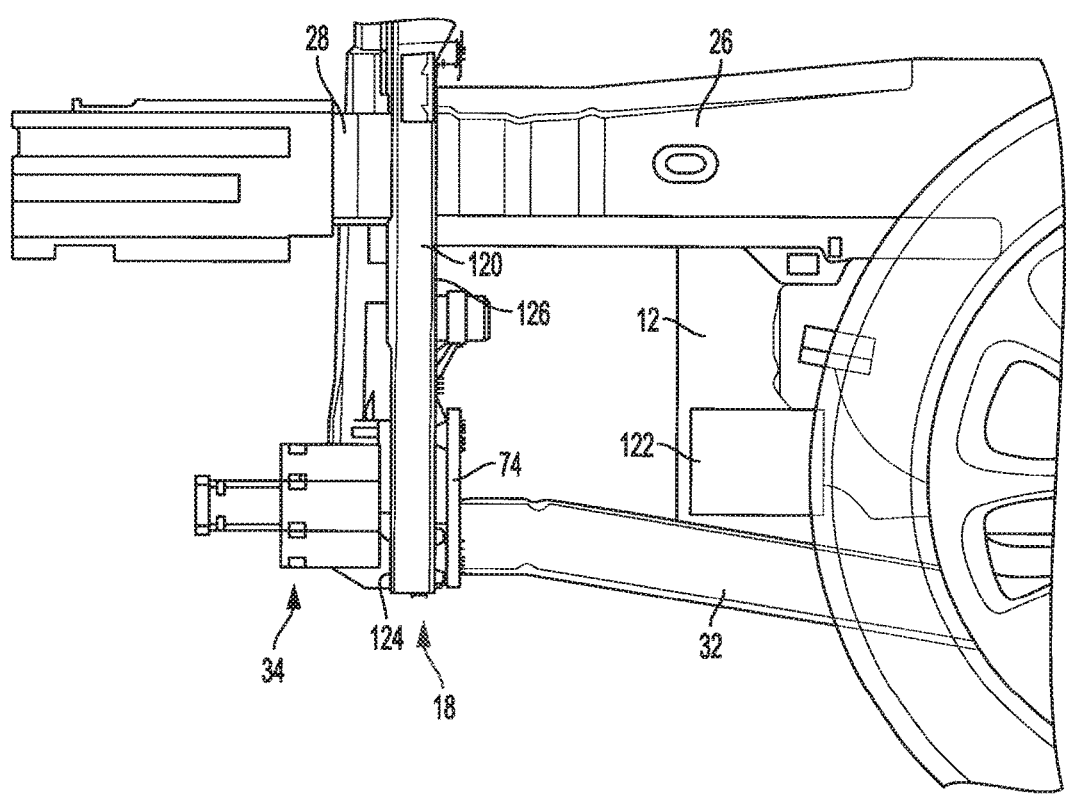
FIG. 3 is a side view of the system shown in FIG. 1, in accordance with the principles of the present disclosure.

FIGS. 1-4 illustrate one example embodiment of the FEM 18 according to the present disclosure. The FEM 18 generally includes a module main body 120 and an impact block 122. As shown in FIGS. 1 and 2, module main body 120 is generally L-shaped and includes a forward surface 124, a rearward surface 126, an upper or vertically extending portion 128, and a lower or laterally extending portion 130.

As shown in FIG. 1, the upper crush can 28 is coupled to the forward surface 124 of the vertically extending portion 128 by plate member 58, which receives fasteners (e.g., bolts) through apertures 60. As shown in FIG. 2, the main load rail 26 is coupled to the rearward surface 126 of the vertically extending portion 128 by plate member 48, which receives the fasteners through aperture 50. At least a portion of aperture 50 and 60 are aligned or substantially aligned to receive common fasteners. Accordingly, main load rail 26 is disposed behind upper crush can 28 and FEM 18 to facilitate absorbing impact loads acting thereon.

As shown in FIG. 1, the lower crush can 34 is coupled to the forward surface 124 of the laterally extending portion 130 by mounting plate 84, which receives fasteners (e.g., bolts) through apertures 94. As shown in FIG. 2, the lower load beam 32 is coupled to the rearward surface 126 of the laterally extending portion 130 and/or the radiator cross member 36 by mounting plate 74, which receives the fasteners through apertures 68. At least a portion of apertures 68 and 94 are aligned or substantially aligned to receive common fasteners. Accordingly, lower load beam 32 is disposed behind lower crush can 34 and FEM 18 to facilitate absorbing impact loads acting thereon.

Figure 7:
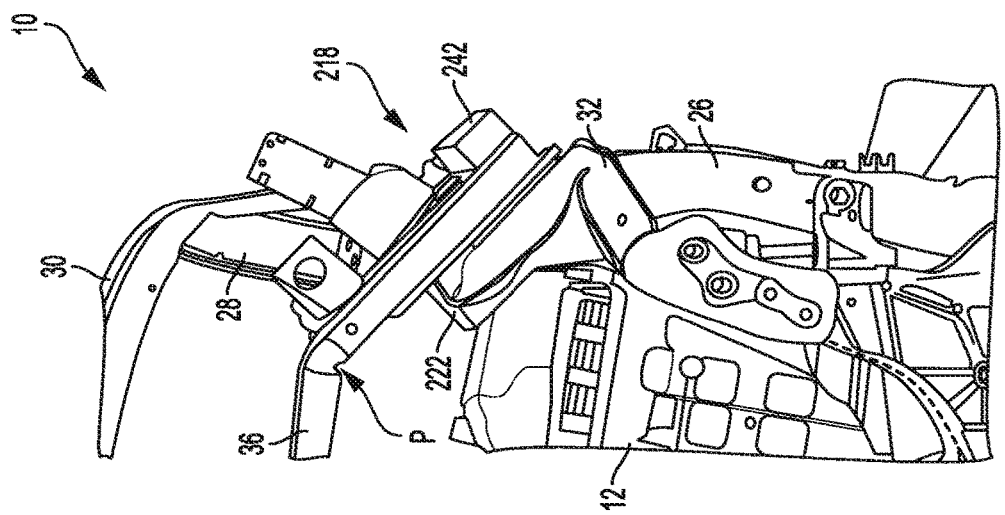
FIG. 7 is a bottom view of a vehicle having the FEM shown in FIG. 5 before a small overlap impact event, in accordance with the principles of the present disclosure.

In the example embodiment, the impact block 122 is coupled to the transmission 12. As illustrated, the impact block 122 is a generally rectangular block positioned rearward of the FEM 18. During an impact event, such as IIHS small overlap test, where the vehicle is impacted against a barrier 'O' along the offset axis 'C', the barrier 'O' first impacts the lower crush can 34. The lower crush can 34 is crushed and absorbs some of the impact load, and the FEM laterally extending portion 130 is subsequently impacted. This causes rearward and inboard movement of the radiator cross member 36, which buckles proximate point 'P' (e.g., see arrows in FIG. 7). The lower load beam 32 absorbs some of the impact load as it too buckles, and the rearward surface 126 of the module main body 120 is brought into contact with the impact block 122 as the FEM 18 bends further rearward and inboard toward the transmission 12.

The impact block 122 then transfers the impact load to the transmission 12, thus diverting impact loads laterally through the powertrain and rotating the vehicle away from the barrier 'O'. Since the transmission 12 is a significant mass of the vehicle 10, the lateral loads transferred to the transmission 12 cause the vehicle 10 to move in a lateral direction generally along cross-car axis 'B' away from the barrier 'O'. This controlled conversion of longitudinal velocity into lateral velocity facilitates moving the vehicle 10 away from the barrier 'O' to minimize impact therewith, thereby facilitating reduced intrusion into the passenger compartment.

FIGS. 5 and 6 illustrate another example embodiment of the FEM according to the present disclosure, generally identified as FEM 218. Like reference numerals identify like parts. The FEM 218 generally includes a module main body 220, a rear impact block 222, a intermediate impact block 240, and a front impact block 242. As illustrated, module main body 220 is generally L-shaped and includes a forward surface 224, a rearward surface 226, an upper portion 228, and a lower portion 230.

In the example embodiment, the upper crush can 28 is coupled to the forward surface 224 of the upper portion 228 by plate member 58, which receives fasteners (e.g., bolts) through apertures 60. The main load rail 26 is coupled to the rearward surface 226 of the upper portion 228 by plate member 48, which receives the fasteners through aperture 50. At least a portion of aperture 50 and 60 are aligned or substantially aligned with apertures 244 (FIG. 5) to receive common fasteners. Accordingly, main load rail 26 is disposed behind upper crush can 28 and FEM 18 to facilitate absorbing impact loads acting thereon.

As shown in FIG. 5, the lower crush can 34 is coupled to the forward surface 224 of the lower portion 230 by mounting plate 84, which receives fasteners (e.g., bolts) through apertures 94. As shown in FIG. 6, the lower load beam 32 is coupled to the rearward surface 226 of the lower portion 230 and/or the radiator cross member 36 by a lateral extension plate member 252, which receives the fasteners through apertures 250. At least a portion of apertures 94 and 250 are aligned or substantially aligned to receive common fasteners. Accordingly, lower load beam 32 is disposed behind lower crush can 34 and FEM 18 to facilitate absorbing impact loads acting thereon.

In the example embodiment, the rear impact block 222 is coupled to the lateral extension plate member 252 and defines a contact surface 254 configured to engage transmission 12 during predetermined impact events. In an alternative embodiment, rear impact block 222 can be coupled to the transmission 12 rather than plate member 252, for example, like block 122 shown in FIG. 1. The lateral extension plate member 252 extends outboard beyond the outboard edge of the module main body 220, and intermediate impact block 240 is coupled to a forward surface 256 of the lateral extension plate member 252. A front spacer plate 258 is coupled to the radiator cross-member 36 and intermediate impact block 240 at a rearward surface 260, and the front impact block 242 is coupled to a forward surface 262 of the front spacer plate 258.

During an impact event, such as the IIHS small overlap test, where the vehicle 10 is impacted against a barrier '0' along the offset axis 'C', the barrier '0' first impacts the lower crush can 34. The lower crush can 34 is crushed and absorbs some of the impact, and the FEM front impact block 242 is subsequently impacted and transfers load through the front spacer plate 258 to the radiator cross member 36 and the intermediate impact block 240. This causes rearward and inboard movement of the radiator cross member 36, which buckles proximate point 'P' (e.g., shown by the arrows in FIG. 7). The lower load beam 32 absorbs some of the impact load from the intermediate impact block 240 as it too buckles, and the rear impact block 222 is brought into contact with the transmission 12 as the FEM 218 bends further rearward and inboard toward the transmission 12.

Figure 8:
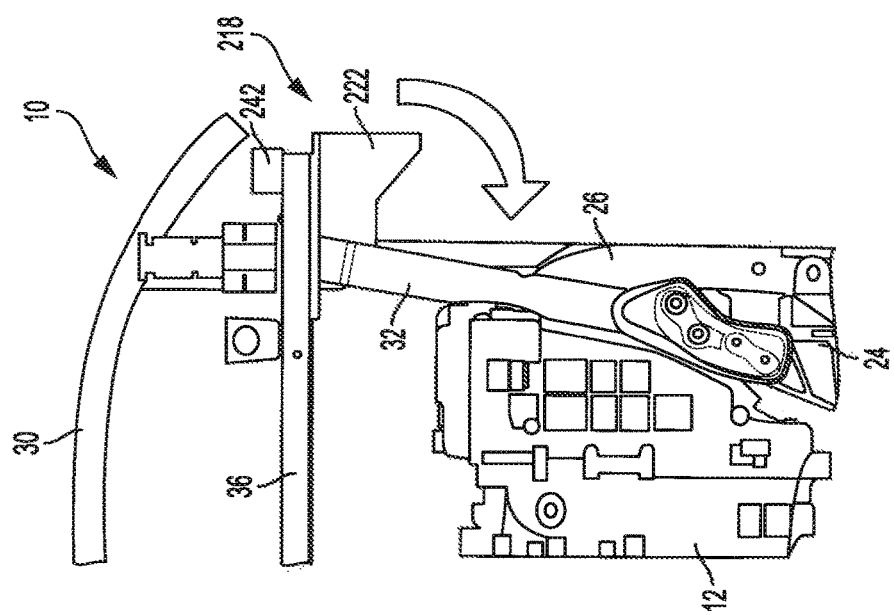
FIG. 8 is a bottom view of the vehicle shown in FIG. 7 after the small overlap impact event, in accordance with the principles of the present disclosure.

The rear impact block 222 then transfers the impact load to the transmission 12 (e.g., FIG. 8), thus diverting impact loads laterally through the powertrain and rotating the vehicle away from the barrier '0'. Since the transmission 12 is a significant mass of the vehicle 10, the lateral loads transferred to the transmission 12 cause the vehicle 10 to move in a lateral direction generally along cross-car axis 'B' away from the barrier '0'. This controlled conversion of longitudinal velocity into lateral velocity facilitates moving the vehicle 10 away from the barrier '0' to minimize impact therewith, thereby facilitating reduced intrusion into the passenger compartment.

Described herein are systems and methods for improving vehicle performance during small overlap impact events. Lower rail/cradle members are flared outboards and attached to an extended portion of the front end structure, which is stretched outboard and reinforced to provide for a wider lateral/vertical load carrying structure. This enables the FEM to rotate and engage with the upper/lower rail structure. An engaging block is included on the FEM or transmission to form a load path with the rotated FEM structure, thereby laterally diverting loads through the powertrain and rotating the vehicle away from the barrier. The system results in reduced passenger compartment intrusion.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A structural support system for a vehicle having a central axis extending from a front of the vehicle to a rear of the vehicle, the system comprising:
   a radiator cross member;
   a lower load beam having a rearward end coupled to a frame of the vehicle, and a forward end coupled to the radiator cross member, the lower load beam oriented at an angle relative to the central axis and extending outwardly as the lower load beam extends toward the front of the vehicle;
   a front end module (FEM) coupled to the radiator cross member, wherein the FEM includes a module main body having an upper portion and a lower portion; and
   an impact block coupled to a transmission of the vehicle, wherein during an impact event where an object impacts the FEM, the FEM and the radiator cross member are configured to absorb an impact load resulting from the impact event and bend rearward and inboard toward the transmission such that the impact block diverts the impact load laterally to the transmission to move the vehicle in a substantially lateral cross-car direction away from the object.

2. The system of claim 1, further comprising a lower crush can coupled to a forward surface of the FEM.

3. The system of claim 2, wherein the lower crush can is disposed along an offset axis of the vehicle defining an outer quarter of a total width of the vehicle.

4. The system of claim 2, wherein the lower crush can laterally overlaps the lower load beam a predetermined distance.

5. The system of claim 4, wherein the predetermined distance is between approximately 30 mm and approximately 50 mm.

6. The system of claim 1, further comprising an insert member disposed within a portion of the radiator cross member.

7. The system of claim 6, wherein the portion of the radiator cross member having the insert member is a reinforced section and the portion of the radiator cross member without the insert member is an unreinforced section, wherein a bending point is defined between the reinforced section and the unreinforced section such that during the impact event, the radiator cross member bends proximate the bending point.

8. The system of claim 1, wherein the lower crush can includes an outer portion and an inner portion.

9. The system of claim 8, wherein the outer portion has an octagonal cross-section and the inner portion has a rectangular cross-section.

10. The system of claim 1, wherein the lower crush can is coupled to the lower portion.

11. The system of claim 10, further comprising an upper crush can coupled to the upper portion.

12. The system of claim 11, wherein the upper crush can is coupled to a bumper of the vehicle.

13. The system of claim 11, further comprising a main load rail having one end coupled to the FEM behind the upper crush can to absorb an impact load therefrom.

14. A structural support system for a vehicle having a central axis extending from a front of the vehicle to a rear of the vehicle, the system comprising:
   a radiator cross member;
   a lower load beam having a rearward end coupled to a frame of the vehicle, and a forward end coupled to the radiator cross member, the lower load beam oriented at an angle relative to the central axis and extending outwardly as the lower load beam extends toward the front of the vehicle;
   a front end module (FEM) coupled to the radiator cross member, wherein the FEM includes a module main body having an upper portion and a lower portion; and
   an impact block coupled to the FEM, wherein during an impact event where an object impacts the FEM, the FEM and the radiator cross member are configured to absorb an impact load resulting from the impact event and bend rearward and inboard toward the transmission such that the impact block diverts the impact load laterally to the transmission to move the vehicle in a substantially lateral cross-car direction away from the object.

15. The system of claim 14, wherein the impact block is a rear impact block, and an intermediate impact block is coupled rearward of a front impact block.

16. The system of claim 15, further comprising a front spacer plate disposed between the front impact block and the radiator cross member.

17. The system of claim 15, further comprising a laterally extending plate member disposed rearward of the intermediate impact block.

* * * * *